(No Model.) L. W. SERRELL. 5 Sheets—Sheet 1.
COMBUSTION OF FLUID FUEL FOR THE DEVELOPMENT OF STEAM.
No. 338,883. Patented Mar. 30, 1886.

(No Model.) 5 Sheets—Sheet 2.

L. W. SERRELL.
COMBUSTION OF FLUID FUEL FOR THE DEVELOPMENT OF STEAM.

No. 338,883. Patented Mar. 30, 1886.

Witnesses:
J. Staib
Chas H. Smith

Inventor:
Lemuel W. Serrell (No Model.) 5 Sheets—Sheet 4.
L. W. SERRELL.
COMBUSTION OF FLUID FUEL FOR THE DEVELOPMENT OF STEAM.
No. 338,883. Patented Mar. 30, 1886.

UNITED STATES PATENT OFFICE.

LEMUEL W. SERRELL, OF PLAINFIELD, NEW JERSEY.

COMBUSTION OF FLUID FUEL FOR THE DEVELOPMENT OF STEAM.

SPECIFICATION forming part of Letters Patent No. 338,883, dated March 30, 1886.

Application filed May 4, 1885. Serial No. 164,317. (No model.)

*To all whom it may concern:*

Be it known that I, LEMUEL WRIGHT SERRELL, of Plainfield, in the county of Union and State of New Jersey, have invented an Improvement in the Combustion of Fluid Fuel for the Development of Steam, of which the following is a specification.

The object of this invention is to obtain a perfect combustion of liquid or gaseous fuel, and to expend all the heat developed by such combustion in the evaporation of water for the production of vapor under pressure for driving an engine.

Petroleum and other liquid hydrocarbons have been atomized by jets of air or steam so as to be burned, and efforts have been made to introduce coal into a confined space and to carry the heat and gases generated into the steam-space of a boiler.

Air-engines are well known in which the air in a cool condition is forced into the fire, and the increased volume of the air when heated is availed of for developing mechanical force.

In the combustion of liquid and gaseous fuel the presence of more air than is required for combustion is detrimental, as the heat of combustion is wasted in raising the temperature of the surplus atmosphere.

In steam generators having a chimney a large volume of heat is lost by the caloric passing up the chimney.

Petroleum, in consequence of its price, in proportion to the heat-units it contains, may not at present be available as an economical fuel in comparison with coal, especially in large furnaces and boilers; but there are many instances where petroleum could be used to advantage if its combustion was rendered perfect and but little heat wasted—such, for instance, as in elevated railways in cities, for pumping water for domestic and other purposes, for engines furnishing a constant power and needing but little attention, &c.

In the present improvements the following objects have been sought:

First. To obtain a perfect combustion of the liquid or gaseous fuel.

Second. To employ only the necessary volume of air, and thus to prevent loss of heat in heating up surplus air.

Third. To burn the fuel under a pressure, and thereby retain the atmosphere in contact with the carbon a sufficient length of time for the pefect union of the oxygen of the air with the combustible elements of the fuel, such as carbon and hydrogen.

Fourth. To develop the heat directly within the steam and water space of the generator, and to bring the same into contact with the water and the steam direct.

Fifth. To entirely dispense with an escape flue or chimney by carrying the gases with the steam through the engine or other working device, thereby reducing the loss of heat to a minimum, because all the heat developed passes into the water and steam and the gases become of the same temperature as the steam, with which they pass off. It is to be understood that loss from radiation outside the apparatus cannot be avoided, but it is to be checked and lessened by non-conducting covering.

Sixth. To economize the power exerted in forcing air into the generator to effect the combustion of the fuel by using the resulting gases in the engine with the steam, and thereby, as in an air-engine, causing the engine-cylinder to exert the force necessary to drive the air-pump, thus leaving the force developed by the generation of steam as an available power unimpeded by the air-forcing device, or nearly so.

Seventh. To return the water to the feed-water pump in a hot condition and charged with carbonic acid to saturation, so that there will be but little loss in volume of the gases in consequence of the water or steam taking up the carbonic acid developed in the combustion of the fuel, and thus prevent the bulk of such gases passing through the engine being materially lessened.

Eighth. To allow the nitrogen and other gases, after passing through the engine, to separate from the steam and pass into the air as the steam condenses into water and is returned to the water-holder and feed-pump.

Ninth. To facilitate the starting of the generator by operating the air-pump by hand.

Tenth. To render the generator and the appliances necessary thereto automatic, so that the supply of fluid fuel, atmosphere, and water will be proportioned to the demand upon the engine driven by the steam and gases.

In these improvements it is to be understood that some devices are described which might, according to present official practice, be claimed in separate applications for patent. They, however, are described herein for the complete presentation of the said invention, and it is hereby expressly stated that all the novel and patentable devices, combination of devices, and modes of operation herein described are my invention, and the right is expressly reserved of claiming any such devices not herein claimed by separate applications or by divided reissue at any time during which the same can be legally done. It is furthermore to be understood that the herein-described improvements may be employed with apparatus different in some respects from that herein described. I however have given descriptions of the principal devices that are advantageously employed.

The steam-engine and pumps made use of are to be of any desired or available character. With small portable apparatus the engine and pump or pumps are advantageously connected with the generator, the latter forming a base or support for the mechanism.

In the combustion of gaseous or atomized liquid fuel it is advantageous to direct the atmospheric air upon the same as opposing forces, and to confine the substances until the perfect combustion of the fuel is obtained, and then to allow the heated gases to pass into and commingle with the steam and the water. With this object in view I place within the steam-generator a retort in which the combination of the atmosphere and the fuel takes place, and the air is introduced with or near to the fuel; and there is atmosphere introduced at a second place to oppose the movement of the flame through the retort.

Figure 1:
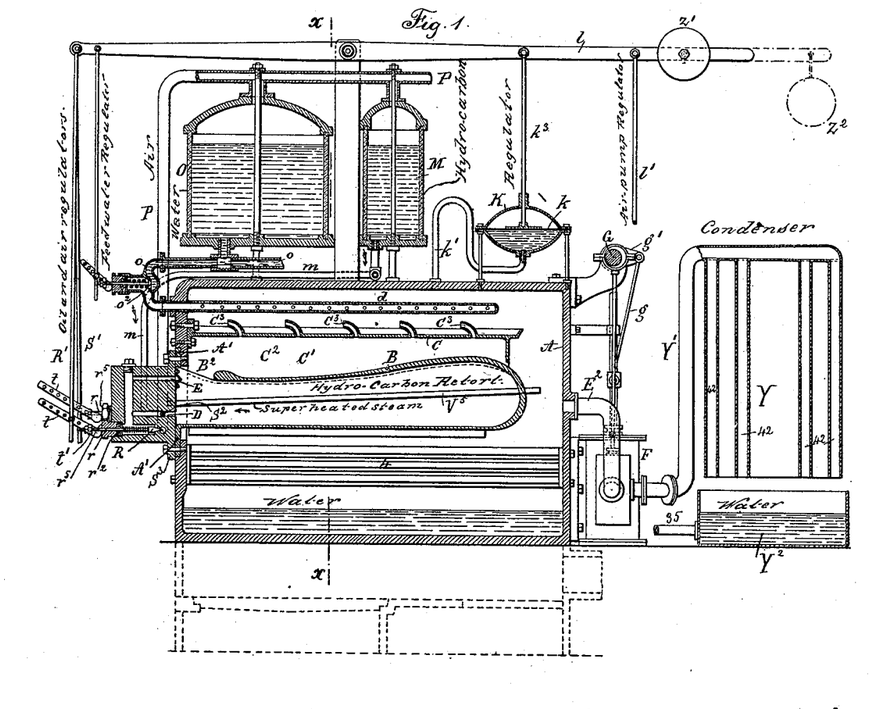
Figure 1 is a vertical section of the apparatus.
Figure 2:
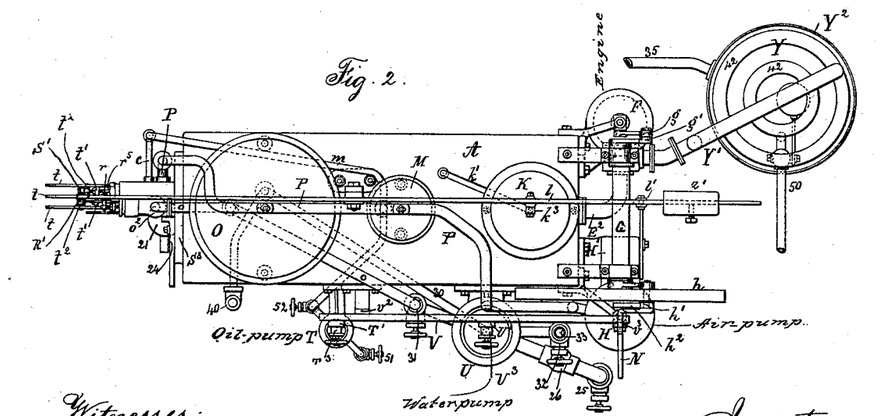
Fig. 2 is a plan view of the same.
Figure 3:
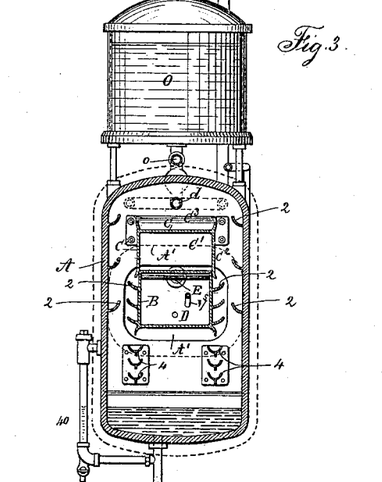
Fig. 3 is a cross-section at the line $x\,x$.

In Fig. 1 an apparatus is shown for carrying out this feature of the invention. Let A represent a vessel of suitable size, and B a retort therein. At $c$ the liquid hydrocarbon or other fluid fuel is introduced, and D is a pipe through which air is injected, and at E is a second air-supply. The air passing in at D commingles with the fuel, and being ignited, burns, and the escape of the flame from the retort B is detained by the air injected at E, so that the burning materials and gases cannot pass out of the retort B until the pressure of such gases in said retort is sufficient to overcome the rush of atmosphere issuing from E, and tending to keep the gases within such retort; hence the gases as they are being consumed have to pass through the thin layer or numerous jets of air issuing from E, and in so doing the flame is kept back and compelled to come into intimate contact with the atmosphere, and the supply of atmosphere is to be in proportion to the supply of fluid fuel, so that but little more atmosphere will be forced into the retort than is necessary for the consumption of all the liquid or gaseous fuel. The retort B is preferably cast with a flange, A', at one end, and the retort is entered into the generator A through an opening in one side, and the flange bolted to the side of the generator, and to this end of the retort the devices, hereinafter described, for regulating the supply of fuel and air are connected. The retort is preferably closed at the inner end, and the top shaped similar to a reverberatory furnace, so that the fuel as it is driven in and atomized by the air-blast passes along near the bottom and then it returns beneath the arched top of the retort and escapes at the throat $B^2$ and passes into the combustion-chamber $c'$ beneath the water-tray $c$. This water-tray $c$ is preferably separate from the retort and bolted into place within the generator, and it is provided with sides $c^2$, that extend down nearly or quite to the top of the retort, so that the combustion-chamber $c'$ is sufficiently separated from the steam and water space of the generator to prevent the combustion being interfered with by the presence of steam or water. The capacity of the retort and of the combustion-chamber is to be sufficiently large for the gaseous or liquid fuel to be perfectly consumed before passing into contact with the steam or water of the generator. An excess of space is preferable to the space being too small. The products of combustion should be carbonic acid. This together with vapors formed by the combustion of the hydrogen in the fuel, the nitrogen and any other gases, pass freely through suitable openings from the combustion-chamber $c'$ directly into the steam and water space of the generator. I prefer to make the tray $c$ with a rim around it, so as to contain water, and to provide numerous openings, $c^3$, passing up through the water-space in the form of long narrow pipes or mouths, with curved ends, to prevent water falling through the mouths into the chamber $c'$. Portions of the products of combustion should also pass away below the sides $c^2$, between the same and the top of the retort.

The water to be evaporated is to be supplied into the generator A, and for this purpose I prefer the pipe $d$, or several of them, which pass nearly horizontal and are perforated with numerous holes, so that the water in fine spray or jets runs down upon the exterior of the tray or trays, the retort, and the interior of the generator-case.

To more thoroughly distribute the water and spread the same over the largest extent of surface, so that it may take up all the heat present, I make use of numerous horizontal troughs or ledges, 2 2, upon the inner surfaces of the generator and upon the exterior surfaces of the tray and the retort. It is desirable that little or no water accumulate in the bottom of the generator, for if the exterior of the retort is cooled too much it will interfere with the perfect combustion within the same. Care is to be taken that the numerous ledges and surfaces over which the water trickles and drops are sufficient to bring the water into contact with the heat, to evaporate the whole or most of the water before it reaches the bottom. With this object in view gutters or troughs 4 4, more or less numerous and overflowing, so as to drip from one to the other, are placed in the generator. It is preferable to take off the steam and gases from one side or end of the generator, so that the heated air and steam will have to descend and become thoroughly commingled and of the same temperature before escaping to the engine.

Let $E^2$ represent the pipe leading to the engine-cylinder F. This engine-cylinder, the valves, and the parts of the steam-engine are to be of any desired character, and do not in themselves form a part of this invention, except so far as being elements in the combination of devices employed in the operations that are necessary to produce the results desired.

I will not describe the engine itself, except to say that the shaft G is to be revolved thereby through the agency of a connecting-rod, $g$, and crank $g'$. Upon this shaft G there is a crank, or, preferably, a fly-wheel, $h$, with a crank-pin, $h'$, connecting-rod $h^2$ to a piston-rod and piston, $h^3$, in the air-pump H, so that during the time that the engine is running the air-pump will also be in operation. This air-pump may be of any desired character.

Figures 5, 6, 7:
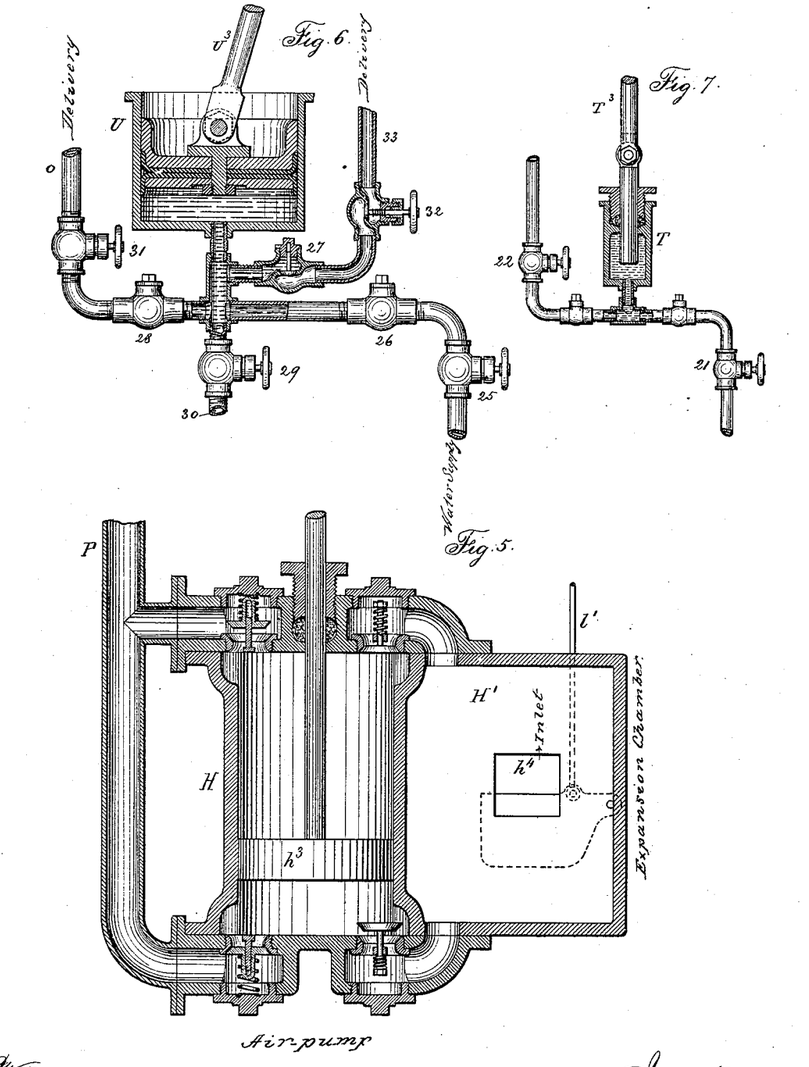
Fig. 5 is a section of the air-pumping apparatus.
Fig. 6 is a section of the water-pump, showing also the connecting pipes and cocks.
Fig. 7 is a similar view of the oil-pump.
Figures 8, 9, 10, 11:
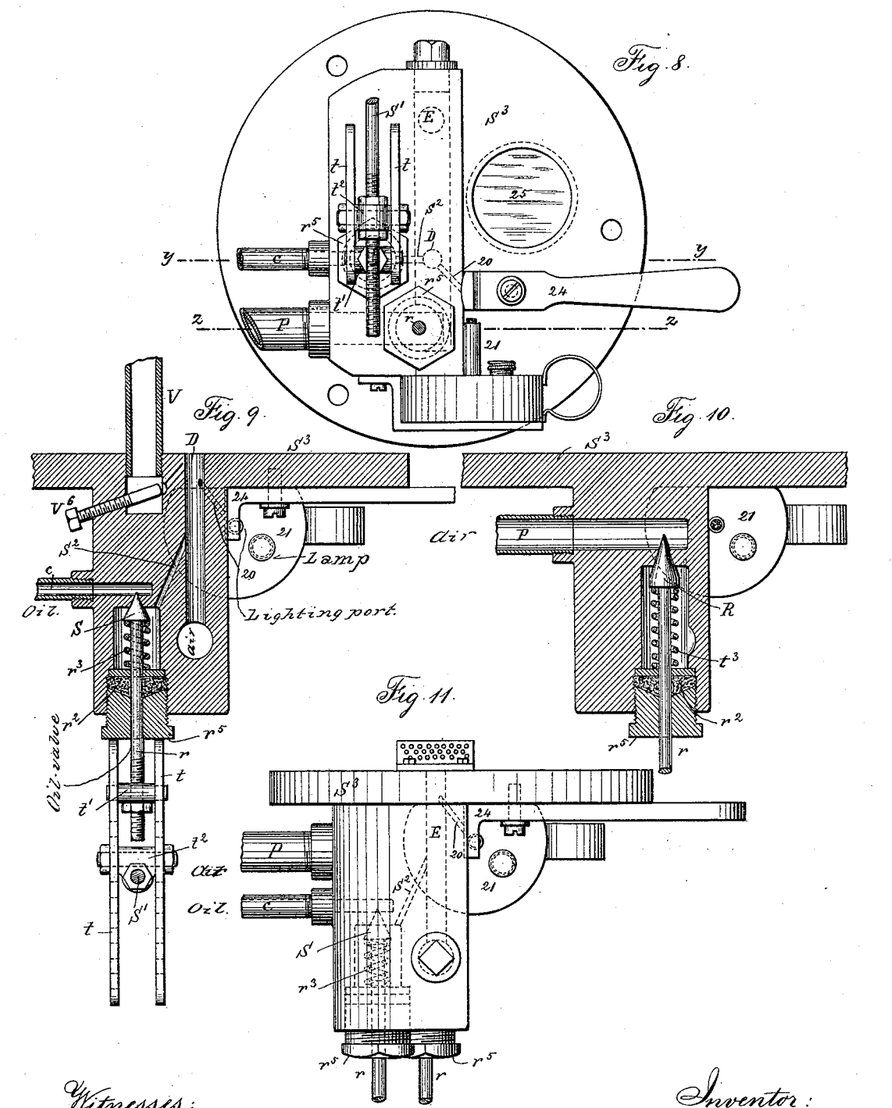
Fig. 8 is an elevation of the retort end and the parts applied to the same.
Fig. 9 is a section at the line $y\,y$, showing the oil valve and passages.
Fig. 10 is a section at the line $z\,z$, showing the air-valve and passage.
Fig. 11 is a plan view of the retort end and the parts connected therewith.
Figure 12:
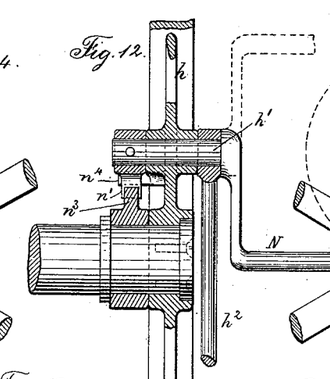
Fig. 12 is a section of the hub of the fly-wheel and the devices for connecting and disconnecting the same from the driving-shaft.

I have represented in Fig. 5 a convenient mode in which the valves may be arranged. In connection with the supply of air for the combustion of the fluid fuel, it is important to regulate the quantity, and to do this without complicated mechanism I prefer to proportion the air-pump to the engine and to the quantity of fuel to be used, so that there will be capacity in the air-pump to supply the maximum quantity of air, and to combine with the pump an expansion-chamber, H', at the induction-ports of the air-pump. This chamber H' has an opening with a cover or valve, $h^4$. By opening or closing this valve $h^4$ the quantity of air admitted to the pump will be regulated, so that the air in the chamber H' will be constantly more or less dilated, and hence the quantity ultimately passed to the retort will be varied without changing the stroke of the pump. In this connection, and for an additional purpose hereinafter named, I make use of a flexible diaphragm, $k$, in the case K, with a pipe, $k'$, to the steam-space of the generator. This is similar to the device heretofore used with steam-dampers. The lever $l$ is acted upon by the diaphragm disk and rod $k^3$, and a connection, $l'$, to the valve $h^4$ is employed for moving said valve, and the connection is placed in such position upon the lever of the valve that when the pressure of the steam becomes greater than the standard or desired pressure in the generator the valve will be moved to lessen the admission of air to the pump, and the contrary when the pressure becomes too little, so as thereby to supply the required volume of air for perfect combustion automatically by the pressure in the generator, and in proportion to the fluid fuel, also supplied automatically to the generator, as hereinafter described. In this connection it is desirable to be able to move the air-pump by hand, where the apparatus is small, before the pressure is developed sufficiently to drive the engine.

In starting air-engines they are usually moved by hand until the necessary heat and pressure are obtained. In large engines the air under pressure may be brought from any desired source, or the generator may be heated by exterior fuel upon a grate below the bottom of the generator, as shown by dotted lines, Fig. 1, so as to obtain the necessary steam-pressure to start the engine and drive the air-pump.

Figure 14:
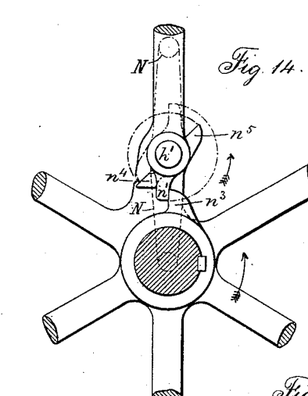
Fig. 14 is a rear view of the crank-pin and coupler.
Figure 15:
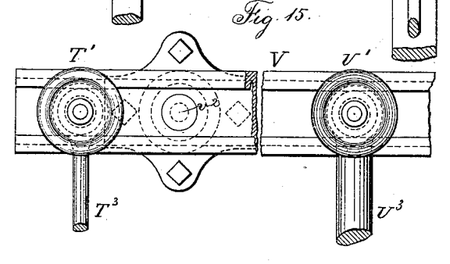
Fig. 15 is an elevation of portions of the lever that operate the water and oil pumps.
Figure 16:
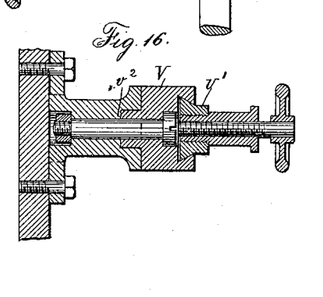
Fig. 16 is a section at the fulcrum of the lever and through one of the connections for the pump-rod.
Figure 17:
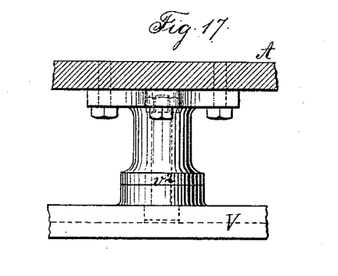
Fig. 17 is a plan of the fulcrum of the lever.

When the air-pump is driven by hand, I prefer to use a crank, N, that extends from and is permanently connected to the crank-pin. This crank-pin $h'$ passes through the crank or through one of the spokes of the fly-wheel, and can be partially rotated by throwing the crank N from a position in line with the axis of the crank to the position for use. In turning this crank N, and partially rotating the crank-pin $h'$, the projection $n'$ on the crank-pin at the back of the fly-wheel or crank is moved out of the way of an arm, $n^3$, fixed upon the shaft G, so that the fly-wheel $h$ and crank-pin $h'$ can be freely revolved upon the end of the shaft G without revolving that shaft, and the projection $n^5$ comes into contact with a stop, $n^4$, upon the fly-wheel $h$, so as to prevent the crank-pin turning too far, so that the crank-handle N can remain fully distended and with the greatest leverage while the air-pump is being operated by hand. When the pressure accumulates sufficiently to drive the engine, such engine will be started and will rotate the shaft G in the same direction as the air-pump crank is being rotated, as indicated by the arrow in Fig. 14, and when the power of the engine is sufficient to actuate the air-pump the parts are coupled by simply turning the crank-handle N back to an axial position, and in so doing the crank-pin $h'$ will be turned and the projection $n'$ be brought in between the arm $n^3$ and the block $n^4$, and the said arm $n^3$ will act upon the projection and the block and will hold the crank-arm N in its axial position, and will rotate the fly-wheel $h$ and crank-pin $h'$ and continue the movements of the air-pump. It now is proper to describe the mode of passing the air and the liquid fuel into the retort B. The liquid hydrocarbon is in a suitable vessel, M, and the pipe $m$ leads the liquid to the pipe $c$, from which it passes into the retort and is atomized, as hereinafter described; but in order to insure the supply of such liquid hydrocarbon I subject the same to the air-pressure by leading the air-pipe P from the pump in such a manner that its pressure will act upon the surface of the liquid in such vessel M, so that the pressure therein will be as great as the pressure in the generator. Besides this, I use the water-holding vessel O, with the pipe $o$ leading to the distributing-pipes $d$ in the generator; and I also make a connection from the air-pipe P to the water-vessel O, so that the water will be exposed to as great a pressure as that in the generator, and the water will freely run by gravity into the generator, the quantity being regulated by the cock $o^2$, or other suitable appliance. The air-pipe P leads to the inlet D of the retort, and the quantity of air admitted is to be regulated by a valve, R.

For regulating the supply of fluid fuel, I make use of, by preference, a valve, S, of a similar character to the air-valve R. The valve R or S is at the end of a rod, $r$, that passes through a packing, $r^2$, and there is a spring, $r^3$, to press the valve to its seat in the air or oil passage. The valve is drawn back or opened by a cam. I prefer and use levers $t$ with cam ends, pivoted to a head, $t'$, upon the rod $r$, and the ends of these levers are connected by a movable swivel, $t^2$, and a bolt passing through it and through holes in the levers $t$. By this construction either valve R or S can be opened or closed, according to the pressure in the generator acting upon the diaphragm $k$. The levers $t$ and swivels $t^2$ are the same for the valve S as for the valve R, and the swivel $t^2$ for the valve S is connected by a rod, $S'$, to the levers $l$, and this rod $S'$ is made as a screw near the end, with clamping-nuts above and below the swivel $t^2$, so that the parts can be adjusted as may be required. The rod $R'$ is similarly constructed, and connected at its upper end to the lever $l$ and at its lower end to the cam-levers $t$ that operate the air-valve R. If the pressure sinks below the minimum, the lever $l$, at its connection with the rods $R'$ $S'$, rises, the cam-levers $t$ are moved at their ends upon the bearing-surfaces $r^5$ around the stems of the valves R and S, and hence the valves are allowed to partially close and ultimately to tightly close by the pressure of the springs $r^3$. This is the position the parts assume when the engine and generator are not in use. When the levers $t$ are at the normal position of about twenty degrees downward inclination, and the proper pressure is in the generator, the valves R S will be opened to the necessary extent. If the pressure lessens, the valves will be opened farther, the weighted lever $l$ descending at the diaphragm $k$ and the rods $R'$ $S'$ being raised until the levers stand horizontally, when the valves will be fully opened. On the other hand, after the maximum pressure has been developed and the levers $t$ move downwardly until they stand horizontally, the further movement of the diaphragm $k$ and lever $l$ causes these levers $t$ to incline downwardly and allows the valves R and S to partially close and lessen the supply of both fluid fuel and atmosphere. Again, as the pressure may lessen to the normal pressure, the levers $t$ will be again raised to a horizontal position and the valves R and S opened to their full extent. By this peculiar means for moving the valves R S the levers $t$ will be at an upward inclination, as seen in Fig. 1, when the apparatus is not in use, and all the valves R, S, and $O^2$ will be closed by their respective springs. The valves will be opened gradually by the accumulation of pressure until they are wide open, and the heat and pressure accumulating, the levers $t$ will assume a downward inclination, and in so doing the valves will commence to close, the normal working position of the levers $t$ being a downward inclination of about twenty degrees.

The same construction and mode of operation exists with the air-valve as with the valve S and its appliances that regulate the supply of the fluid fuel to the fire in the retort. As the pressure lessens the supply of fuel is to be increased up to the maximum, and as the pressure increases beyond the maximum the supply of fuel is to be lessened. When there is no pressure, the parts turn so that the cams are out of contact with the surfaces $r^5$, and the valves close tightly by the springs, and in so doing prevent the flow of the fuel and water into retort. The screw on each valve-stem and the the holes in the levers $t$ allow the parts to be adjusted with accuracy, so as to regulate the supply of air, water, and fluid fuel to the exact relative proportions for the most economical running of the apparatus. The jet of air is made to atomize the liquid fuel in consequence of the said liquid running drop by drop or in a small stream from the valve S, by the conduit $S^2$, to the upper part of the air-conduit D, so that such air passing along with rapidity shall atomize the liquid and project it into the retort B.

In starting the apparatus it is important to provide a means for lighting the fuel. I therefore make an opening at 20, passing diagonally into the air-passage, so that the rush of air along that air-passage may draw in a flame from a lamp, 21, or any suitable burner, and thereby ignite the fuel. There may be a valve or a lever, 24, that can be turned so that its end covers and effectually closes this opening 20 when the fuel is fully ignited. I also provide an opening at 25, through the front plate, $S^3$, at the end of the retort B, with glass or mica therein, so that it may be seen whether the combustion is properly going on in the retort B.

The perfect combustion of some qualities of liquid hydrocarbon is sometimes promoted by the introduction of hydrogen. This can be obtained from steam; but if the steam is introduced at ordinary temperature a period of time elapses before the steam becomes sufficiently hot to be decomposed in the presence of carbon. To avoid this difficulty, I superheat the steam and only use such a proportion as can be advantageously employed. With this object in view I provide a pipe, $V^5$, within the retort, opening at its rear end in the steam-space of the boiler and at the other end near the inlet of the air and fuel. The steam is drawn through this superheating-pipe in consequence of the opening from the end of that pipe standing diagonally to the issuing jet of air and fluid fuel, so that the superheated steam passes directly into the fuel and increases its temperature. The quantity is regulated by a cock or valve, $V^6$. The action in this case is that the carbon present seizes on the oxygen in the superheated steam and the hydrogen of the steam is liberated and burns in the presence of the atmosphere that is blown in. The hydrogen also acts as a diluent to the carbon vapors present and promotes perfect combustion and lessens risk of smoke or the deposit of solid carbon in the retort. By the devices herein described it will be apparent that the combustion is so under control that such combustion can be made the most perfect, and thereby the greatest, volume of heat that a given quantity of fluid carbon fuel is capable of producing can be obtained, and that that heat being all retained within the generator will evaporate as much water as it is possible to vaporize, and that the gases developed passing through the engine with the steam will aid in the development of power to the same extent, or nearly so, as the engine will be loaded in actuating the air-pump, thus leaving the entire force of the steam, or nearly so, to act as a motive power in the engine.

Another feature remains to be explained to show the entire completion of this improvement. It is necessary to supply water into the holder or vessel O and to supply liquid hydrocarbon into the vessel M. This may be done by hand periodically, but in large engines especially it is preferable to do so progressively or periodically by the engine itself. I provide an oil-pump, T, and a water-pump, U, and a lever, V, pivoted at $v^2$ upon the outside of the generator, and this lever is constantly moved by a link, $v^3$, connecting its end with the joint between the air-pump piston-rod and its connecting-rod $h^2$. This lever V should have a V-shaped groove in its face and receive the pivot-blocks T' of the oil-pump T, and U' of the water-pump. These pivot-blocks have studs that receive the links $U^3$ $T^3$ of the respective pumps, and these pivot-blocks are dovetailed so as to slide in the grooved lever, and they can be moved by hand and placed in any position on the lever V that may be desired, so as to obtain more or less motion for the pump-piston according to the position of its pivot-block. The oil-pump T is provided with a supply-pipe and cock, 5, and a pipe and cock, 52, to the oil vessel or holder M. The pivot-block T' is near the pivot $v^2$ of the lever V, so that the pump T can receive a small constant motion to keep up the supply of oil into the holder M, or the pivot-block T' can be brought into line with the pivot $v^2$, so that the oil-pump ceases to act when the vessel M is sufficiently filled.

Figure 4:
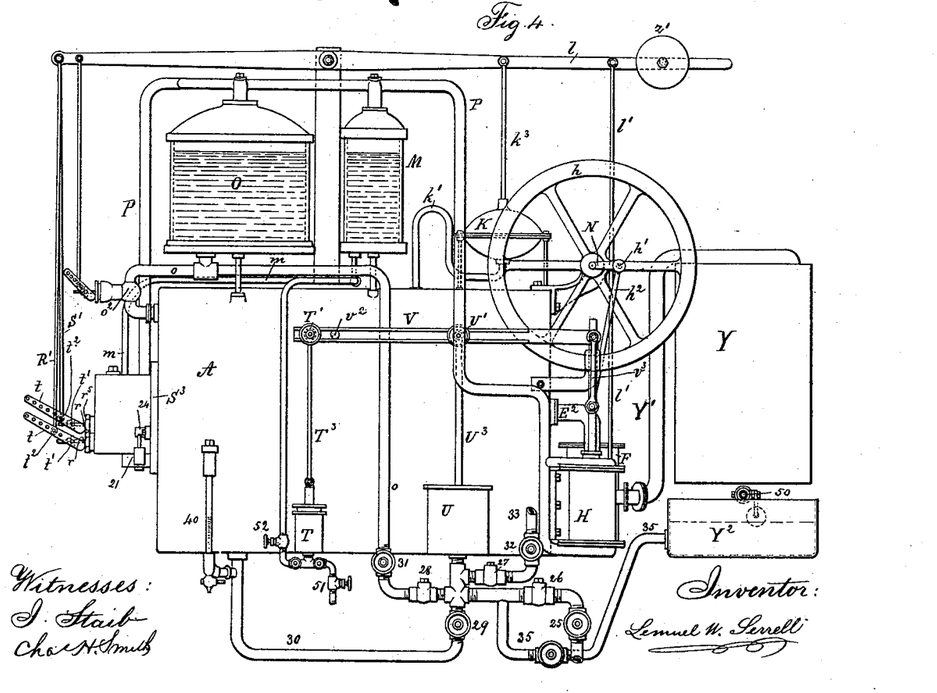
Fig. 4 is an elevation of the apparatus at the side where the pumps are located.

If the engine is used for other purposes than pumping water, (such as running trains on elevated railways or moving other machinery,) the water-pump U should be placed nearer to the oil-pump T than shown in Fig. 4, so as to pump only the amount of water required for the generator. I have represented a pump adapted to raising water as well as supplying water to the generator through the vessel O.

Upon reference to Figs. 4 and 6 the arrangement of pipes, valves, and cocks will be understood. The pump U is of any desired size or construction, according to the object intended. It is represented as an ordinary suction and force pump. The water-supply pipe and cock 25 lead the water into the pump. The pipe $o$ and cock 31 lead the water to the vessel O. The pipe 33 and cock 32 lead to any reservoir to which the water is to be forced. At 26 27 28 ordinary check-valves are shown. If the valve 32 is closed and 31 open, all the water pumped will go to the vessel O. If 31 is closed and 32 open, all the water pumped will go to the reservoir; or it may be proportioned to each if the relative pressures permit of so doing.

As before mentioned, it is important to prevent the accumulation of too much water in the lower part of the generator. To guard against this I place a glass gage of any ordinary construction at 40 and connect a pipe, 30, and cock 29 with the pump U, so that the water may be pumped from the bottom of the generator A up into the vessel O, should there be too great accumulation in the former. The steam discharged from the engine is accompanied with nitrogen, carbonic acid, and oxide and other gases, and there is more or less carbonic acid in the watery particles.

To economize the water I prefer to use a surface-condenser, Y, made of two or more pairs of thin copper cylinders, the pairs being connected together at the top, but open at the bottom to form vapor-chambers, the intermediate annular spaces being open for the free circulation of currents of air upwardly through between the vapor-chambers. The pipe Y' from the engine crosses and opens into the annular vapor-chambers 42, and there is a water-holding vessel, Y², below the condenser, into which the water of condensation drops, and there is a space between the water-holding vessel Y² and the lower end of the condenser sufficient for the free circulation of the atmosphere to cool the condenser. As the steam condenses the water will absorb any gases that it is capable of containing, and all other gases will pass off into the atmosphere, and when returned to the generator there will be little or no loss of volume in the gases developed by the combustion of the fluid fuel, because the water will not be in a condition to absorb such gases.

The pipe and cock 35 to the pump U allow for taking the water from the vessel Y² and pumping it into the supply-vessel O; and where the engine is not used for pumping water there should be a supply-pipe and ball-cock, 50, to the vessel Y², by which the water can be supplied into the vessel Y² to whatever extent may be required in excess of the water of condensation to supply the generator.

It is preferable in a small apparatus to make the vessels O and M of glass cylinders cemented at top and bottom into the annular grooves of the metal heads, and to hold the heads together by central bolts passing also through the central air-inlet pipes, as shown in Fig. 1. In larger apparatus glass gage-tubes may be used, so that the attendant can ascertain by inspection that the proper volumes of water and oil are present for use in the generator. By this improvement the risks of explosion and fire are reduced as much as possible. There is but a small quantity of liquid fuel near the apparatus, any vapors from the same are constantly carried off with the air into the retort, and the water is constantly supplied into the apparatus as required, and in case of any derangement of the parts the engine will stop by the lack of pressure, and all the valves close automatically for shutting off the air, the fluid fuel, and the water to the generator. The vessels O M also become expansion-chambers to equalize the action of the air as pumped into the retort.

Figure 13:
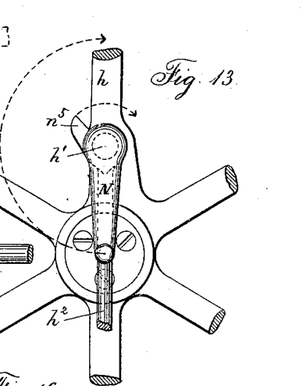
Fig. 13 is an elevation of the said parts.

Upon starting the apparatus by hand the lamp 21 is to be lighted, the hole 20 opened by turning the lever 24 aside, the handle N is grasped and turned in the ordinary direction, as indicated by dotted lines, Fig. 13, which swings it out and gives the leverage for turning the fly-wheel and operating the pump, the air-passage to the pump is fully open, the air is pumped into the generator, and the attendant with one hand simply presses down upon the lever $l$ at the rods R′ S′, and thereby turns on the water, air, and oil supplies, and fuel is ignited and the retort rapidly heated, the air-pressure in the generator accumulates until sufficient to operate the engine. There being but little water to heat, the retort soon becomes hot enough to generate steam, and the handle N is simply held and turned back into a position axial to the shaft G, and the engine, generator, and entire apparatus are automatic. The apparatus is stopped by hanging on an extra weight at $z^2$ to close the valves, or by shifting the weight $z'$ temporarily, so as to close the valves R S, or the engine can be stopped by simply pressing on the weight $z'$ by hand, to extingush the flame by shutting off the supply of fluid fuel and gas.

I claim as my invention—

1. The method herein specified of burning fluid fuel and vaporizing water, consisting in forcing such fuel into the flame within a retort by the action of an air-jet under pressure, and promoting a perfect combustion by jets of air acting in the opposite direction to the flame to check its escape from the retort, and causing the heated gases to pass into a generator containing water, substantially as set forth.

2. The method herein specified of evolving a fluid under pressure, consisting in driving into a retort a fluid fuel and burning the same in the presence of air under pressure, passing the resulting gases into a chamber or generator into contact with water supplied in small streams or spray to be vaporized by the heat and pass off in the form of steam with the gases, substantially as specified.

3. The method herein specified of evolving a fluid under pressure, consisting in forcing air into a retort, supplying fluid fuel into that retort and burning the same, passing the products of combustion into a generator that incloses the retort, and supplying water in spray or small streams into such generator to come into direct contact with the heated gases, substantially as set forth.

4. The method herein specified of evolving a fluid under pressure, consisting in forcing air into a retort, supplying fluid fuel into such retort, burning the same, promoting a perfect combustion by opposing the escape of the flame by jets of air, passing the flame into a combustion-chamber and allowing the products of combustion to pass into a surrounding generator and act directly upon water to vaporize the same, and to leave the generator with the steam, substantially as set forth.

5. The method herein specified of vaporizing water, consisting in supplying the same in jets or small streams into a chamber and upon ledges or troughs, burning fluid fuel in a retort in the presence of atmosphere, and exposing the water and the ledges or troughs to the direct action of the gases resulting from the combustion of such fluid fuel, substantially as set forth.

6. The method herein specified of vaporizing water and evolving a fluid under pressure, consisting in pumping air into a retort, supplying and burning within that retort a fluid fuel, causing water to trickle over surfaces that are heated by the combustion, and causing the products of combustion to escape into the generator containing the water and steam, so as to commingle and pass off with the steam, substantially as set forth.

7. The method herein specified of developing and employing a fluid under pressure, consisting in pumping air into a retort, supplying and burning in that retort a fluid fuel, vaporizing water by bringing the same in the form of spray or streams into contact with the heat developed, and passing the products of combustion and the steam jointly through the engine that drives the air-pump and performs other work, substantially as set forth.

8. The method herein specified of developing a fluid under pressure, consisting in forcing air into a retort, supplying liquid fuel into the retort and burning the same, exposing the liquid fuel to the air-pressure in the vessel, holding the same so that it is free to run by gravity into the retort and against the pressure within the retort, and passing the resulting products of combustion into a surrounding generator into which water is supplied in a spray or streams and with which the products of combustion come into direct contact, substantially as set forth.

9. The method herein specified of supplying and vaporizing water for the development of a fluid under pressure, consisting in forcing air into a chamber or retort, supplying a combustible fluid into that retort, passing the products of combustion into a surrounding generator, causing the water to flow in streams or jets into such generator by gravity and the pressure of the air upon the water in the vessel holding such water, substantially as set forth.

10. The method herein specified of vaporizing water and obtaining a fluid under pressure, consisting in burning a fluid fuel in a retort in the presence of air pumped into that retort, passing the products of combustion into the chamber or generator surrounding the retort, causing the water to shower or trickle over the heated portions of the generator and in direct contact with the products of combustion, and returning the surplus water from the bottom of the generator to the supply, substantially as set forth.

11. The method herein specified of vaporizing water and commingling the same with the products of combustion to form a fluid under pressure, consisting in forcing air into a retort, supplying into the same a fluid fuel, burning the same in said retort, passing the products of combustion into a chamber beneath a water-holding vessel, and through openings in said vessel into a generator into which water is supplied and in which the steam and gases commingle, substantially as set forth.

12. The method herein specified of burning a fluid fuel and vaporizing water, consisting in forcing air and a fluid fuel into a retort and burning the same, and introducing into the same retort superheated steam in a regulated proportion, and directing the heated gases into the generator containing water, substantially as set forth.

13. The method herein specified of developing a fluid under pressure, consisting in forcing into the flame within a retort a fluid fuel and atmospheric air and steam superheated by the heat in the retort before entering the flame within the retort, and forcing in additional air near the place where the products of combustion leave the retort, and passing the products of combustion into a generator into direct contact with water in a divided condition, substantially as set forth.

14. The method herein specified of developing a fluid under pressure and utilizing the same, consisting in forcing a fluid fuel into the flame within a retort by the action of air under pressure, passing the products of combustion into a generator and supplying into the generator water in spray or streams, whereby the heat developed is transferred to the water for the production of steam without reducing the temperature of the retort unduly, passing the steam and gases through an engine for converting the heat developed into mechanical force, and actuating the air-forcing mechanism by the engine, substantially as specified.

15. The method herein specified of developing a fluid under pressure and utilizing the same, consisting in forcing a fluid fuel into the flame within a retort by the action of air under pressure, passing the products of combustion into a generator, and supplying water in streams or spray into the generator and into contact with the products of combustion, whereby the heat developed is transferred to the water for the production of steam, passing the steam and gases through an engine for converting the heat developed into mechanical force, and passing the fluid from the engine through a condenser to recover the water or a portion of it and allow the gaseous products of combustion to escape into the atmosphere, substantially as set forth.

Signed by me this 1st day of May, A. D. 1885.

LEMUEL W. SERRELL.

Witnesses:
GEO. T. PINCKNEY,
HAROLD SERRELL.